Aug. 13, 1940.  G. M. BRUSH  2,210,896
RAILROAD CAR REFRIGERATION
Filed Oct. 5, 1934   2 Sheets-Sheet 1
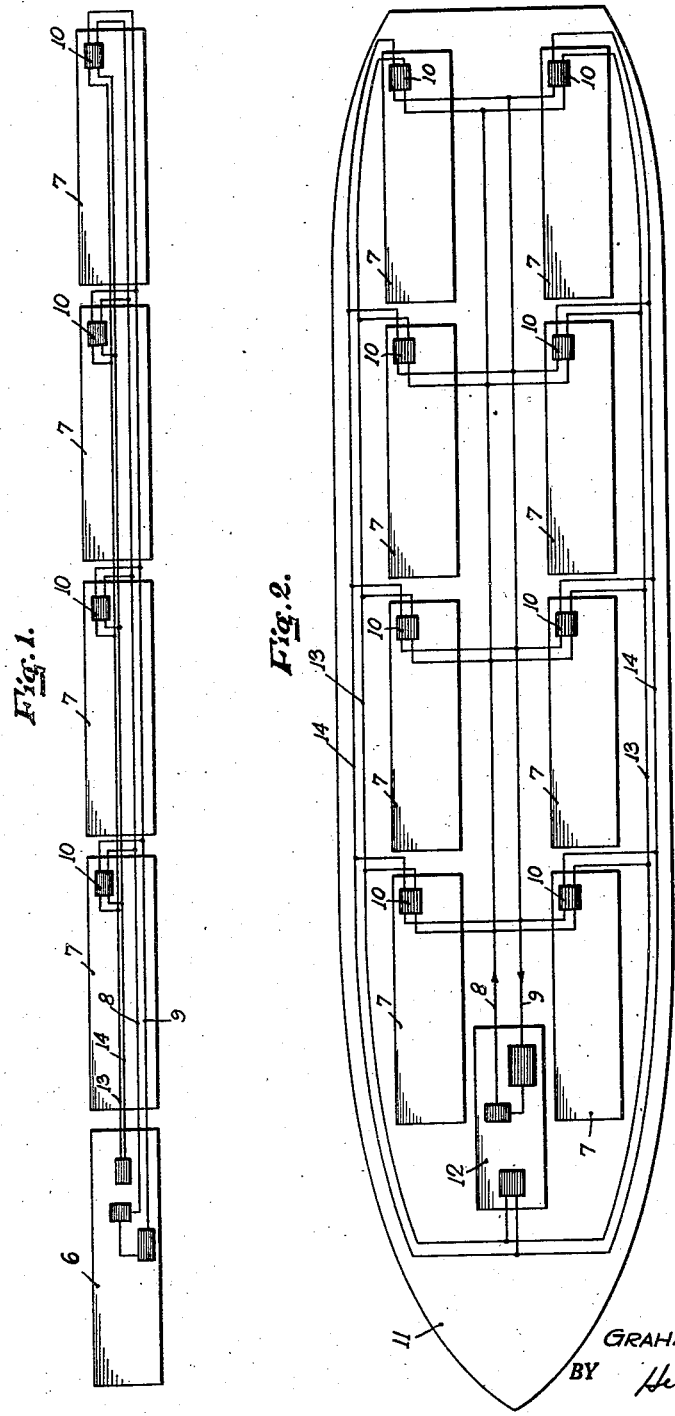
INVENTOR.
GRAHAM M. BRUSH,
BY
ATTORNEY.

Aug. 13, 1940.     G. M. BRUSH     2,210,896
RAILROAD CAR REFRIGERATION
Filed Oct. 5, 1934     2 Sheets-Sheet 2

INVENTOR.
GRAHAM M. BRUSH,
BY
ATTORNEY.

Patented Aug. 13, 1940

2,210,896

UNITED STATES PATENT OFFICE 2,210,896

RAILROAD CAR REFRIGERATION

Graham Manvel Brush, Greenwich, Conn.

Application October 5, 1934, Serial No. 747,025

6 Claims. (Cl. 62—117)

This invention relates to the preservation of produce and perishable merchandise, and more particularly to the conditioning of air in freight cars or other containers, cargo space of boats, and interior storage areas of vehicles generally.

The general object of the invention is to provide a system of air conditioning for railroad trains in which conditioning apparatus may be readily removably positioned within a designated space in a freight car for the purpose of producing and maintaining controlled atmospheric conditions best suited for the preservation of produce or other merchandise carried in the car. The cars are not only adapted readily to accommodate air conditioning apparatus, preferably of the unit type, which may easily be installed on and removed from the car, but are also equipped with means for linking the apparatus on each car with a refrigerant source located on the train in a master car or the like, remote from the individual freight cars. Consequently, as additional freight cars are added to the train, they are equipped with the necessary removable conditioning apparatus, whereas, at destination or transfer points, when cars are cut out of the train, the conditioning apparatus of such cars may be removed therefrom, thus releasing the apparatus for service in other cars. The space in each of the cars in which the apparatus is adapted to be accommodated, may also be used as an ice bunker or the like, so that upon the removal of the apparatus, as for example, when a car is shunted to a branch line whose trains do not include a master car, such space may be loaded with ice, solid carbonic, or the like, so that continued refrigeration in the car may be carried on.

Another object of the invention is to provide a system of air conditioning for railroad cars loaded upon a boat for transit over water routes. The cars, prior or subsequent to embarcation, will be equipped with removable air conditioning apparatus. This apparatus, preferably in unit form, may be suspended from the roof of a car or may suitably be positioned through a hatch thereof, or may be removably secured to a wall or the floor of the car. A central refrigeration station on the boat is linked to the apparatus by conduits including removable coupling means. Thus, the apparatus in each car will be supplied with a suitable refrigerant, such as cold water, brine, or the like, and will also be linked to a source of power for operating the motors and controls, if any, used in connection with the apparatus.

A further object provides for supplying refrigerant from a central station to a plurality of apparatus units or container means located on the freight cars or other vehicles. The cars, or the like, are suitably equipped to accommodate brine tanks within which removable units may be positioned. Removable conduits connect the units to the central station in order to complete a refrigerant circuit between the units and the central station. If desired, instead of utilizing units for cooling brine or the like in the tanks, the brine may be pumped directly from the central station to the tanks to supply desired refrigerating effect for cooling the cars.

A feature of the invention resides in the provision of a removable unit adapted to control the temperature of the car, humidity conditions in the car, and air movement in the car, thus enabling a shipper to be assured of the maintenance of optimum conditions in the car requisite for preservation of particular kinds of produce or merchandise shipped.

Another feature of the invention resides in the provision of linking means whereby certain cars of a series may be served by a refrigeration medium from a master car, although intermediate cars in the series, which link the served cars, will remain unaffected.

Another feature of the invention resides in the provision of a central refrigeration station on a boat in combination with a plurality of removable conditioning units adapted to be readily installed upon and removed from different cars or containers placed at a plurality of different points in the cargo space of the boat.

Another feature provides for supplying liquid refrigerant from a central station to a plurality of movable cars or containers adapted to be differently positioned within a given area at an infinite number of points within the area.

Other features provide for supplying refrigerant from a single source, but at a wide range of desired temperatures to a plurality of points remote from the source; provide for varying not only the temperature of the medium, but its use in a series of cars or in individual cars whereby predetermined atmospheric conditions in the cars will be maintained despite fluctuations in atmospheric conditions outside the car or in load conditions within the car. These and other features making for economy in first and operating costs, flexibility in meeting traffic requirements, and practicability in its application to a wide variety of uses, will be more apparent from the following detailed description of one form of the invention, to be read in connection with the accompanying drawings, in which:

Fig. 1 illustrates, diagrammatically, a train to which the invention is applied;

Fig. 2 illustrates, diagrammatically, a boat similarly equipped;

Figure 3:
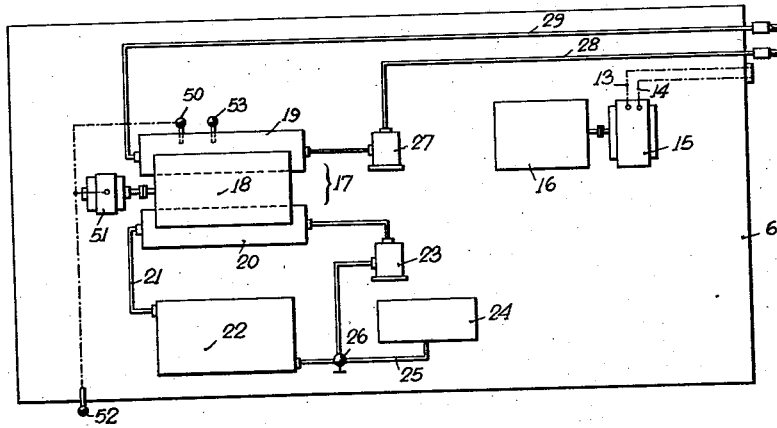
Fig. 3 shows a master car adapted to supply refrigerant to a series of cars in a train in which the master car is located.

Considering the drawings, similar designations referring to similar parts, numeral 6 (Fig. 1) designates a master car equipped with a suitable refrigeration plant and accessories for supplying cooling medium to cars 7 through supply and return conduits 8 and 9. A unit conditioner 10 is removably positioned in each of cars 7 and readily connected to and disconnected from conduits 8 and 9 and suitable power supply lines. Similarly, in Fig. 2, where the invention is shown utilized on a boat 11, a central station refrigeration plant 12 serves a plurality of enclosures, which, as illustrated, are in this case a series of freight cars which have been loaded upon the boat. It should be understood that although only the refrigerant conduits are shown, electrical conduits served, for example, by a generator in the master car, or in the central station on the boat, may similarly be provided for supplying power to the individual cars. As shown on Figs. 2, 3 and 4, electrical conduits 13 and 14 serve the individual cars 7, as do refrigerant supply conduits 8 and 9. While electrical power will usually be required for operating pumps, motors, controls and the like, it should be understood that applicant, if desired, may rely upon natural circulation, and in that event, it may not be necessary to link a power source to the individual cars.

In Fig. 3, the master car 6 is shown equipped with electrical generator 15 driven by a suitable device 16, such as a motor, internal combustion engine or turbine supplied with steam from the locomotive of the train. This generator will supply the electrical energy necessary to drive or operate the pumps, fans and other elements of the air conditioning equipment. Refrigerating machine 17 comprises a compressor 18 suitably driven, as by an electric motor (served by generator 15). No limitation is made with respect to the type of compressor or driving means therefor. An evaporator 19 and condenser 20 cooperate with the compressor to give the desired refrigerating effect. Although the refrigerating apparatus may be designed to supply liquid refrigerant directly to supply conduit 8, the preferred arrangement is to utilize a medium such as water or brine flowing through pipes located within the evaporator. In the usual manner, a suitable refrigerant is compressed and discharged within condenser 20; water circulating in pipes within the condenser causes condensation of the refrigerant which is then delivered to the evaporator wherein it is vaporized to cool the water or brine; the refrigerant then being withdrawn by the compressor and the cycle repeated. The condenser water is discharged through pipe 21 to cooling tower 22, of suitable design. The cooled water is withdrawn from the tower and discharged by pump 23 to condenser 20. To replace the condenser water lost through evaporation in the cooling tower or otherwise, a reserve supply is maintained in tank 24 suitably located. Pipe 25, and valve 26, provide means for drawing upon this supply when necessary. In the same manner, make-up water may be drawn, if desired, from the tender, in the case of a steam locomotive. The chilled water, or brine, is taken from evaporator 19 by pump 27 and delivered through suitably insulated pipe 28 which connects with conduits 8, the various conduits 8 and return conduits 9 being linked together between various cars of the train by suitable flexible couplings similar to the present steam and air connections. Return pipe 29 is similar to supply pipe 28. Electrical conduits similar to 13 and 14 are provided on each of the cars, suitable flexible electrical couplings being provided between the cars in order to supply the necessary power.

Figure 4:
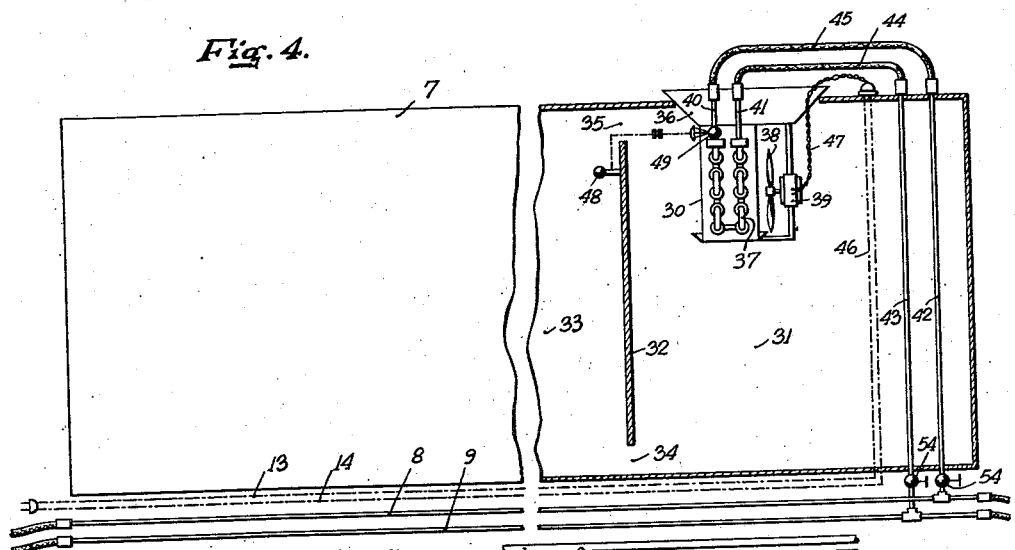
Fig. 4 shows a freight car in which a unit may be removably positioned and to which refrigerant may be suitably supplied from the master car.

In Fig. 4, car 7 is shown equipped with removable air conditioning unit 30. Compartment 31 in one portion of the car, which for purposes of illustration is shown at one end of the car, is equipped with baffle or partition 32 and communicates with the pay load compartment area 33 by means of passages or spaces 34 and 35 between the partition and bottom and top of the car. This affords a circulation of air between areas 31 and 33. The unit 30 is shown attached to hatch 36 which fits within a suitable access opening in the top of the car. The hatch is designed to fit tightly within and seal the opening when the unit has been positioned inside the compartment 31. The unit is provided with cooling coils 37, fan 38, motor 39 and suitable supporting means for securing the unit to the hatch. Lead-in conduits 40 and 41 connect to supply and discharge headers of the unit, and are, in turn, connected to supply and return conduits 8 and 9. Flexible coupling conduits may, if desired, be used to connect 40 and 41 to 8 and 9. In Fig. 4, the car is shown equipped with intermediate supply and return pipes 42 and 43 which constitute a part of the permanent equipment of the car. As a result, when putting the car in service, it is merely necessary to couple conduits 8 and 9 of one car to conduits 8 and 9 of adjacent cars, and connect short flexible couplings 44 and 45 between 41 and 43 and 40 and 42. Similarly, the power lines are connected to each car by intermediate lead-in connection 46 which is suitably linked to 13 and 14 by connectors. The lead-in connection 46 may be a permanent part of the car's equipment and the unit is connected thereto by electrical coupling 47. There is no limitation with respect to the manner of connecting the refrigerant and electrical terminals of the unit to the conduits 42, 43 and 46, nor is there any limitation with respect to the positioning of conduits 42, 43 and 46 on the car. Thus, if an access door on some types of cars enables an operator to enter compartment 31, it may be desirable to have conduits 42, 43 and 46 terminate within the car and the connections then made to the unit by suitable links which reach the unit beneath the hatch instead of through it. In this case, it may be desirable to arrange the unit so that it may be slidably positioned within holding means on the hatch instead of fastened to it.

The unit 30 is arranged to produce and maintain desired atmospheric conditions in the pay load area of the car, and no limitation is made with respect to the particular type of control employed. Thus, for example, dry bulb thermostat 48 may be suitably positioned within the car and respond to changing temperature conditions therein. Refrigerant control valve 49 is under the control of thermostat 48 so that when temperature conditions within the car drop below a predetermined minimum, valve 49 will close and shut off the supply of refrigerant to the unit; whereas when conditions require cooling, the thermostat will cause the valve 49 to open. The valve may be of the graduated acting type, whereby it will open and close gradually responsive to changes in temperature within a prescribed range, or may be of the positive acting type. Similarly, the speed of fan 38 may be controlled, if desired, by regulating the speed of motor 39 responsive to changing atmospheric conditions in compartment 33. The motor would speed up the fan when maximum conditioning and air circulation would be required, whereas upon a drop in temperature below a prescribed minimum limit, the fan's speed would be reduced or the operation stopped entirely. In like manner, different methods of control may be employed in connection with the operation of the refrigeration apparatus located in master car 6. For example, thermostat 50 in evaporator 19 will respond to changes in load conditions in the cars served by the refrigerating machine as reflected in the temperature within the evaporator. Upon a rise in temperature within the evaporator, above a prescribed minimum, the thermostat will cause driving motor 51 (or equivalent driving means) to become operative, thereby starting up compressor 18. If desired, a thermostat 52, responsive to changing conditions in the atmosphere outside the car, may be arranged to close the circuit for motor 51. By this means, the refrigeration will be started up when the train enters a warm area, before the temperature of the car interiors has had an opportunity to rise above the desired degree. This enables refrigeration to build up storage capacity to anticipate a rise in temperature in the cars which will tend to take place some time after the train has entered the warmer area; and the converse will also be true, i. e., the refrigeration will be reduced or cut off when the train enters a cold area, and so prevent freezing or adverse low temperatures in the cars. On long runs, where mountainous stretches and lowlands are traversed, wide temperature fluctuations, especially under summer conditions are often encountered, and this control will enable the system to anticipate the needs of the cars before they are adversely affected.

The thermostat 50 may also be arranged, if desired, to control a rheostat, for example, arranged in connection with motor 51, so that the speed of the motor will be regulated responsive to changing load requirements. Similarly, a dew-point control 53 may be provided to regulate the production of refrigerating effect so that a desired temperature of the refrigerant is always obtained and the refrigerating machine cut out of service when the temperature falls below the desired minimum. This will prevent freezing and consequent breakage under conditions when the temperature might fall below the freezing point.

Similarly, the dewpoint control 53 may be utilized to regulate a heater to be used for raising the temperature of refrigerant in the evaporator whenever warmer conditions are required in the cars than those existing therein.

Although applicant has outlined various methods of control adapted for use in his system, no limitation is made with respect to any specific method of control or types of apparatus employed, and any equivalent arrangement capable of producing substantially the same results is deemed to be within the purview hereof.

In operation, a series of units 30 will be made available at designated equipment loading or transfer points. As a train is made up, the units will be removably positioned in respective compartments 31 of cars to be conditioned; and the refrigerant supply and return lines, as well as electrical conduits will be connected together between adjacent cars. In the event certain cars are not to be afforded refrigeration service, the valves 54 will be kept closed, whereas in active cars, the valves will be opened and couplings 44, 45 and 47 connected between the unit in the ends of conduits 42, 43 and 46. In general, electrical wires for controls will be arranged so that one cable leading from the unit will connect not only to the power supply lines, but to the controls as well. The master car will be cut into the train and the refrigerant supply then made available to the cars under suitable control as hereinbefore described. When a car is cut out of the train, valves 54 are closed, the unit and couplings removed, and if further refrigeration is required, the bunker 31 will be loaded with ice, solid carbonic, or the like, and a hatch cover put in position to seal the top opening. The compartment 31 is suitably provided with drains. In the event the master car breaks down, or is removed from a train, or in the event the car is shunted to a siding, a refrigerant medium, if available, can be supplied to the unit in like manner as from the master car, provided suitable power supply is available. Otherwise, ice storage or the like will supply the required refrigeration, since the compartment 31, in accordance with the invention may alternatively be used either as a conditioning chamber adapted to accommodate air conditioning apparatus or as an ice bunker.

Figure 5:
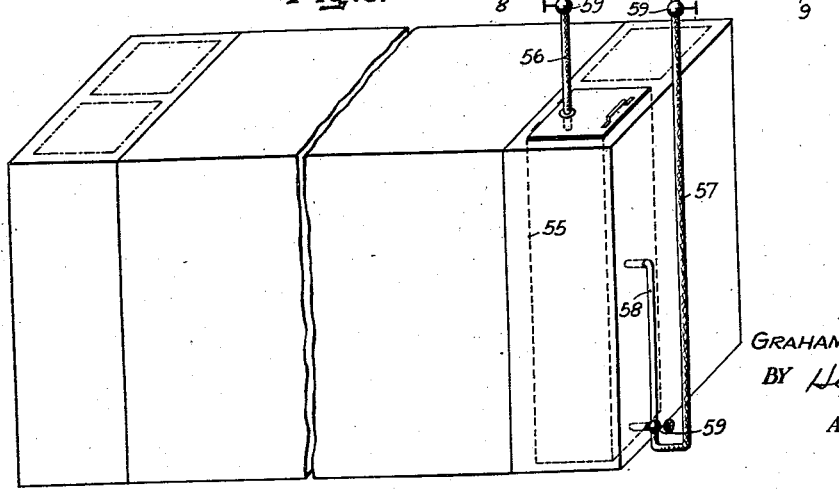
Fig. 5 illustrates one form of applicant's invention applied to a brine car.

In sea-train operations, where cars are loaded upon a boat, refrigerant will be supplied from a central station plant, such as 12 in Fig. 2. Refrigerant conduits 8 and 9, suitably insulated, will be provided in different cargo areas, and be supplied with refrigerant from the central station. The cars will be equipped with removable units, usually before the cars are placed on the boat, and after the cars have been positioned in the cargo space, the units will be connected by flexible couplings to the conduits 8 and 9, in like manner as in the train system hereinbefore described Similarly, a power line connecting to the unit will be plugged into a suitable receptacle provided in the cargo space, preferably in proximity to the refrigerant conduits. In the case of brine cars, as shown in Fig. 5, the units will be suitably removably positioned within tanks 55. the units preferably being suspended within the tanks in like manner as withinin the hatch opening shown in Fig. 4 but submerged in the brine. The units will thus cool the brine in the tanks 55 in contact with which the air from the car will naturally circulate. Instead of placing units within tanks 55, applicant may connect a plurality of flexible couplings 56 to refrigerant supply conduit 8 and feed the refrigerant directly within the tanks, as shown. The refrigerant will be returned to the central station through flexible couplings 57 connecting to return conduit 9. The couplings 57 may be removably connected to overflow connections 58 leading from tanks 55. Valves 59 serve to control the flow of refrigerant from the conduits to the cars through the couplings, as illustrated.

Since certain changes in carrying out the above process and in the constructions set forth, which embody the invention may be made without departing from its scope, it is intended that all matter contained in the above description or shown in the accompanying drawings shall be interpreted as illustrative and not in a limiting sense.

I claim:

1. An apparatus for conditioning the air in a railroad car having a hatch opening formed in the roof thereof, including a removable hatch cover for covering and closing said opening, heat exchange apparatus mounted upon said hatch cover and extending within the railroad car when said hatch cover is placed in position to close said hatch opening, an electric fan mounted upon said hatch cover proximate said heat exchange apparatus for circulating air in contact with said heat exchange apparatus, conduits extending through said hatch cover and connecting with said heat exchange apparatus for circulating conditioning medium through said heat exchange apparatus, and electrical supply lines associated with said hatch cover for supplying electrical energy to operate said fan, said hatch cover and heat exchange apparatus and fan and conduits and electrical supply lines being integrally formed and being removable from said car as a unit.

2. An apparatus for conditioning the air in a railroad car having a hatch opening formed in the roof thereof, having primary conduits connecting to a source of conditioning medium and having primary electrical supply lines, which includes a removable hatch cover for covering and closing said hatch opening, a heat exchange coil mounted upon said hatch cover and arranged to extend within the car when said hatch cover is in position to close said hatch opening, an electric fan mounted upon said hatch cover proximate said coil and arranged to circulate air in contact with said coil, secondary conduits associated with said hatch cover connecting with said coil and adapted to be removably connected with said primary conduits for circulating conditioning medium through said coil, and secondary electrical supply lines associated with said hatch cover connecting with said electric fan and adapted to be removably connected with said primary electrical supply lines, said hatch cover and coil and secondary electrical supply lines being removable from said car as a unit.

3. The combination with a normally sealed vehicle having a hatch opening in the roof thereof and a bunker space in alignment with said hatch opening, said bunker space being defined by one end of said vehicle and a vertical partition extending from near the top to near the bottom of said vehicle and providing a top passageway and a bottom passageway at the top and bottom of said partition respectively, connecting the bunker space and the interior of the vehicle; of a heat exchange unit removably mounted in said hatch opening and extending into said bunker space, comprising a hatch cover sealing said opening and a heat exchange coil removable as a unit with said hatch cover, said heat exchange coil having a blower associated therewith adapted to circulate air from the interior of the car through said bottom passageway over said heat exchange coil and back into the interior of the car through said top passageway.

4. The combination with a normally sealed vehicle having a hatch opening, a bunker space in alignment with said hatch opening and means providing communication between said bunker space and another portion of the vehicle interior for the circulation of air between said bunker space and said other portion of the vehicle interior; of a heat exchange unit removably mounted in said hatch opening and extending into said bunker space, comprising a hatch cover adapted to seal said opening, and a heat exchange means removable as a unit with said hatch cover, said heat exchange means having an air circulating means associated therewith adapted to circulate air withdrawn from said other portion of the vehicle interior past said heat exchange means and back into said other portion of the vehicle interior.

5. The combination with a normally sealed vehicle having a hatch opening, and a bunker space in alignment with said hatch opening, said bunker space being defined by one end of said vehicle and a vertical partition extending from near the top to near the bottom of said vehicle and providing a top passageway and a bottom passageway at the top and bottom of said partition respectively, connecting the bunker space and the interior of the vehicle; of a heat exchange unit removably mounted in said hatch opening and extending into said bunker space, comprising a hatch cover adapted to seal said opening, and a heat exchange means removable as a unit with said hatch cover, said means having an air circulating means associated therewith adapted to circulate air from the interior of the vehicle through said bottom passageway past said heat exchange means and back into the interior of the vehicle through said top passageway.

6. An apparatus for conditioning the air in a normally closed vehicle having a hatch opening including a removable hatch cover for covering and closing said opening, heat exchange apparatus mounted on said hatch cover and extending within the behicle when said hatch cover is placed in position to seal said hatch opening, means mounted on said hatch cover for circulating air inside of said vehicle in contact with said heat exchange apparatus and about the interior of the vehicle in a cyclic manner, conduits connecting with said heat exchange apparatus through said hatch cover for circulating conditioning medium through said heat exchange apparatus, and means connected through said hatch cover for operating said air circulating means, said hatch cover, heat exchange apparatus, and air circulating means being removable from said car as a unit.

GRAHAM MANVEL BRUSH.